US011710168B2

United States Patent
Shan et al.

(10) Patent No.: US 11,710,168 B2
(45) Date of Patent: Jul. 25, 2023

(54) SYSTEM AND METHOD FOR SCALABLE TAG LEARNING IN E-COMMERCE VIA LIFELONG LEARNING

(71) Applicants: Beijing Wodong Tianjun Information Technology Co., Ltd., Beijing (CN); JD.com American Technologies Corporation, Mountain View, CA (US)

(72) Inventors: Huasong Shan, Mountain View, CA (US); Hui Zhou, Sunnyvale, CA (US)

(73) Assignees: BEIJING WODONG TIANJUN INFORMATION TECHNOLOGY CO., LTD., Beijing (CN); JD.COM AMERICAN TECHNOLOGIES CORPORATION, Mountain View, CA (US)

(*) Notice: Subject to any disclaimer, the term of this patent is extended or adjusted under 35 U.S.C. 154(b) by 192 days.

(21) Appl. No.: 17/107,472

(22) Filed: Nov. 30, 2020

(65) Prior Publication Data
US 2022/0172269 A1 Jun. 2, 2022

(51) Int. Cl.
*G06Q 30/06* (2023.01)
*G06N 3/04* (2023.01)
(Continued)

(52) U.S. Cl.
CPC ........ *G06Q 30/0627* (2013.01); *G06F 16/38* (2019.01); *G06F 40/295* (2020.01); *G06N 3/049* (2013.01); *G06Q 30/0201* (2013.01)

(58) Field of Classification Search
None
See application file for complete search history.

(56) References Cited

U.S. PATENT DOCUMENTS 9,767,409 B1* 9/2017 Makhijani ........... G06F 16/7867
10,635,751 B1* 4/2020 Relangi ................ G06N 3/0445
(Continued)

FOREIGN PATENT DOCUMENTS

CN 112148877 A 12/2020

OTHER PUBLICATIONS

Chowdhury et al, A multitask bi-directional RNN model for named entity recognition on Chinese electronic medical records, Dec. 28, 2018, BMC Bioinformatics 19, Article No. 499, pp. 75-84 (Year: 2018).*
(Continued)

*Primary Examiner* — Robert W Beausoliel, Jr.
*Assistant Examiner* — Cheryl M Shechtman
(74) *Attorney, Agent, or Firm* — Scully, Scott, Murphy & Presser, P.C.

(57) ABSTRACT

Systems and method for lifelong tag learning. The system includes a computing device having a processor and a storage device storing computer executable code. The computer executable code is configured to: provide product descriptions and seed tags characterizing products; train a named-entity recognition (NER) model using the product descriptions and the seed tags; predict pseudo tags from the product descriptions using the NER model; calculate confidence scores of the pseudo tags; compare the confidence scores with a threshold, and define the pseudo tags as true tags when the confidence scores are greater than the threshold; add the true tags to the seed tags to obtain updated tags; and repeat the steps of training, predicting, calculating, comparing and adding using the product descriptions and the updated tags, so as to keep updating the updated tags.

18 Claims, 9 Drawing Sheets

(51) Int. Cl.
  *G06F 40/295* (2020.01)
  *G06F 16/38* (2019.01)
  *G06Q 30/0601* (2023.01)
  *G06Q 30/0201* (2023.01)
  *G06N 3/049* (2023.01)
  *G06Q 30/02* (2023.01)

(56) References Cited

U.S. PATENT DOCUMENTS

| | | | |
|---|---|---|---|
| 2009/0254540 A1* | 10/2009 | Musgrove | G06F 16/31 707/999.005 |
| 2017/0011077 A1* | 1/2017 | Kypreos | G06Q 40/00 |
| 2020/0372219 A1* | 11/2020 | Relangi | G06N 3/08 |
| 2021/0034701 A1* | 2/2021 | Fei | G06N 3/0454 |
| 2021/0089964 A1* | 3/2021 | Zhang | G06K 9/6231 |
| 2021/0224651 A1* | 7/2021 | Crone | G06N 3/0445 |

OTHER PUBLICATIONS

Jacob Devlin, Ming-Wei Chang, Kenton Lee, and Kristina Toutanova, BERT: Pre-training of deep bidirectional transformers for language understanding, 2018, arXiv:1810.04805, pp. 1-16.

Bidirectional recurrent neural networks, Wikipedia, https://en.wikipedia.org/wiki/Bidirectional_recurrent_neural_networks, pp. 1-3.

Long short-term memory, Wikipedia, https://en.wikipedia.org/wiki/Long_short-term_memory, pp. 1-13.

Conditional random field, Wikipedia, https://en.wikipedia.org/wiki/Conditional_random_field, pp. 1-7.

Guillaume Lample, Miguel Ballesteros, Sandeep Subramanian, Kazuya Kawakami, and Chris Dyer, Neural architectures for named entity recognition, Proceedings of NAACL-HLT 2016, 2016, 260-270.

Ruixue Ding, Pengjun Xie, Xiaoyan Zhang, Wei Lu, Linlin Li, and Si Luo, A neural multi-digraph model for Chinese NER with gazetteers, Proceedings of the 57th Annual Meeting of the Association for Computational Linguistics, 2019, 1462-1467.

Pengfei Cao, Yubo Chen, Kang Liu, Jun Zhao, and Shengping Liu, Adversarial transfer learning for Chinese named entity recognition with self-attention mechanism, Proceedings of the 2018 Conference on Empirical Methods in Natural Language Processing, 2018, 182-192.

Yuying Zhu, and Guoxin Wang, CAN-NER: Convolutional attention network for Chinese named entity recognition, Proceedings of NAACL-HLT 2019, 2019, 3384-3393.

Emma Strubell, Patrick Verga, David Belanger, and Andrew McCallum, Fast and accurate entity recognition with iterated dilated convolutions, Proceedings of the 2017 Conference on Empirical Methods in Natural Language Processing, 2017, 2670-2680.

Li, Z., et al., "Learning to select pseudo labels: a semi-supervised method for named entity recognition", Frontiers of Information Technology & Electronic Engineering 2020, Revision accepted Apr. 17, 2019, Crosschecked Aug. 19, 2019, Published online Dec. 27, 2019 pp. 903-916, 21(6).

* cited by examiner

500A

| Household Appliance > | Large Appliance ∨ | > | | |
|---|---|---|---|---|
| Brand | SIEMENS | HAIER | ZF | Mi |
| | VINOCAVE | LITTLESWAN | EKEA | SKYWORTH |
| Screen size | 78 Inches & Up | 70-75 Inches | 65 Inches | 58-60 Inches | 55 In |
| Washer Capacity | 20 Kg & Up | 10-20 Kg | 9.1-9.9 Kg | 9 Kg | 8.1-8.9 Kg |
| Frequency Type | Constant | Variable | | |
| Advanced | Heating & Cooling Type ∨ | Motor Type ∨ | Height ∨ | Energy Efficiency Rating ∨ | Product Feature ∨ |
| | Automatic Self-Cleaning | Quiet Air Conditioner | Cylindrical Air Conditioner | Independent Dehumidification | Easy to Take part and Wash |
| Smart Air Conditioner | | | | | |

| Introduction | Specifications & Packaging | Customer Service | Customer Review (560 k+) | Appointment |

Customer Review

Positive
98%

- suitable size (481)
- fast open/close (432)
- elegant appearance (383)
- full-automatic and intelligent (232)
- beautiful and high-end (210)
- easy to control (80)
- suitable for living room (61)
- comfortable (38)
- clear voice (20)
- convenient (17)
- must haves for home theater (13)

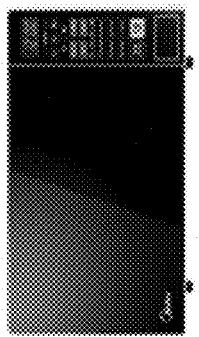

MEIDI Fast Microwave

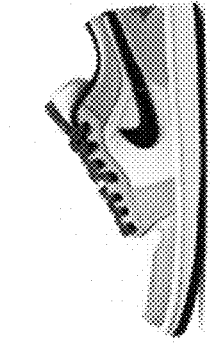

NIKE Rebound Cushioning AJ1 ...

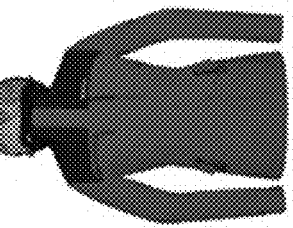

TOREAD waterproof multiple pockets ...

FIG. 5C

```
1   Input:
2     unstructured_text_old_prds /* a set of unstructured text for each old product */,
3     unstructured_text_new_prds /* a set of unstructured text for each new product */,
4     list_of_old_prds /* a list of product categories */,
5     list_of_new_prds /* a list of product categories */,
6     bootstrap_tags_of_old_prds /* a set of bootstrap tags as seed tags for each old product */
7   Output: a set of tags for each product
8   Procedure:
9   Begin
10    /* tbd_list_of_categories is to do list of product categories to learn tags*/
11    tbd_list_of_categories = list_of_old_prds + list_of_new_prds
12    /* unstructured_text is all unstructured text for all corresponding product categories */
13    unstructured_text = unstructured_text_old_prds + unstructured_text_new_prds
14
15    While True: /* never-ending tag learning*/
16      If len(tbd_list_of_categories) == 0:
17        break /* if to do list is null, it means all product categories have enough good tags, so stop learn*/
18      /* use bootstrap tags and all unstructured text to generate dataset */
19      dataset = generate_dataset(bootstrap_tags_of_old_prds, unstructured_text);
20      model = train_NER_model(dataset) /* train the NER model using the new generated dataset */
21
22      for cate in tbd_list_of_categories: /* iterate tbd_list_of_categories of product categories*/
23        /* use the model to predict the entities in the inputted unstructured text as pseudo tags */
24        pseudo_tags = model.predict(unstructured_text)
25        for p_tag in pseudo_tags: /* iterate all pseudo tags */
26          /* calculate the confidence score for a pseudo tag*/
27          conf_score_of_p_tag = cal_conf(p_tag, unstructured_text)
28          /* get bootstrap tags for this product category, if it is new product category, bootstrap_tags is null*/
29          bootstrap_tags = get_tags(bootstrap_tags_of_old_prds)
30          if conf_score_of_p_tag > threshold_of_tag_promotion:
31            /* if the confidence score of a pseudo tag is bigger than the promotion threshold */
32            bootstrap_tags.append(p_tag) /* add pseudo tag into bootstrap tags of this category */
33        end for /* end of for-loop for all pseudo tags */
34
35        if condition_of_stop_learning(bootstrap_tags):
36          /* if meet the condition of stopping learning tag */
37          /* delete this product from to_do_list of product categories */
38        else:
39          if cate in list_of_new_prds:
40            list_of_old_prds.append(cate) /* if it is new product, add it into old product list */
41      end for /* end of for-loop for all product categories */
42      /* continue with next iteration tag learning to increase recall for this category in to-do-list product categories */
43    end while /* end of never-ending tag learning*/
44
45  End
46
47
```

FIG. 7

| # of tags / Products | V0 | V1 | V2 | V3 | V4 | V5 |
|---|---|---|---|---|---|---|
| Garment & Large appliances | 1011 | 47 | 76 | 74 | 85 | 65 |

FIG. 8

| # of tags / Products | V0 | V1 |
|---|---|---|
| Emulsion facial cream | 0 | 146 |
| Makeup remover | 0 | 93 |
| Cleanser | 0 | 109 |
| Toner | 0 | 143 |
| Eyebrow pencil | 0 | 75 |
| Eyecream | 0 | 116 |
| Essence | 0 | 140 |
| Manicure | 0 | 68 |
| Sunscreen | 0 | 110 |
| Mask sheet | 0 | 113 |
| perfume | 0 | 104 |
| Desk | 0 | 95 |
| Bed | 0 | 127 |
| Sofa | 0 | 126 |
| TV stands | 0 | 99 |
| Portable closet | 0 | 41 |
| Wardrobe | 0 | 108 |
| Show Storage Cabinet | 0 | 109 |
| Dining Table | 0 | 122 |

FIG. 9

SYSTEM AND METHOD FOR SCALABLE TAG LEARNING IN E-COMMERCE VIA LIFELONG LEARNING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates generally to the field of named-entity recognition (NER), and more particularly to systems and methods for learning product tags continuously with high precision and high recall.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Major e-commerce sites, like JD.com, Taobao, sell tens of thousands of products. For each product, operators define various types of tags for different operation purposes. For example, they may define product tags for search in goods' search bar, define product tags for customers' comments and their classification, and define product tags as sale points in short titles, etc. Overall, these tags are very important and crucial for the operation of e-commerce websites from sales and marketing to customer support and product teams. Good and accurate tags make a big impact for users' shopping experience, (e.g., fast search, accurate product evaluation), even revenue of e-commerce companies (e.g., accurate recommendation and business grow).

However, it is challenging to designing good tags that accurately define products' industrial attributions, functions, sale points, audience and scenario of goods. Firstly, it requires product experts with special domain knowledge, who fully understand product, sale points and its audience. Secondly, products in e-commerce websites frequently change, new goods are stocked on the shelves every day.

Therefore, an unaddressed need exists in the art to address the aforementioned deficiencies and inadequacies.

SUMMARY

In certain aspects, the present disclosure relates to a system for lifelong learning of product tags. In certain embodiments, the system includes a computing device. The computing device has a processor and a storage device storing computer executable code. The computer executable code, when executed at the processor, is configured to:

retrieve product descriptions of products, and provide seed tags, where the product descriptions include text or words that are identical to seed tags (in other words, the seed tags are extracted or recognized from the product descriptions) and the seed tags characterize at least one of the products;

train a named-entity recognition (NER) model using the product descriptions and the seed tags;

predict pseudo tags from the product descriptions using the NER model;

calculate confidence scores of the pseudo tags;

compare each of the confidence scores with a threshold, and define one of the pseudo tags as a true tag when the confidence score of the pseudo tag equals to or is greater than the threshold;

add the true tags to the seed tags to obtain updated tags; and repeat the steps of training, predicting, calculating, comparing and adding using the product descriptions and the updated tags, so as to keep updating the updated tags.

In certain embodiments, the number of the seed tags is a small number, while the number of the updated tags may be large after iterative learning.

In certain embodiments, the NER model has a bidirectional encoder representations from transformers (BERT) layer, a bidirectional long short-term memory (BiLSTM) layer, and a conditional random field (CRF) layer. In certain embodiments, the three layers are sequentially arranged in the above sequence from the input end to the output end.

In certain embodiments, the confidence score of each of the pseudo tags is a number of detections of the pseudo tags from the product descriptions. For example, if the same pseudo tag is detected from three product descriptions, then the confidence score for the pseudo tag is three.

In certain embodiments, the tags belong to different types, and the types of tags include brand tags indicating brands of the products, industrial attribution tags indicating important physical features of the products, function tags indicating functions of the products, style tags indicating styles of the products, feeling tags indicating impression of customers to the products, scenario tags indicating suitable scenarios for using the products, and audience tags indicating targeted customers of the products. In certain embodiments, the threshold is 2-3 for the brand tags, 5-20 for the industrial attribution tags, the style tags, the audience tags, and the scenario tags, and 10-50 for the feeling tags.

In certain embodiments, values of the thresholds of the tags increase during different rounds of repeating the steps of training, predicting, calculating, comparing and adding.

In certain embodiments, the NER model is configured to provide a label for each character of the product descriptions, the labels include beginning of a brand ($B_{bra}$), middle of a brand ($M_{bra}$), end of a brand ($E_{bra}$), beginning of a product industrial attributions ($B_{att}$), middle of a product industrial attribution ($M_{att}$), end of a product industrial attribution ($E_{att}$), beginning of a function ($B_{fun}$), middle of a function ($M_{fun}$), end of a function ($E_{fun}$), beginning of a style ($B_{sty}$), middle of a style ($M_{sty}$), end of a style ($E_{sty}$), beginning of a feeling ($B_{fel}$), middle of a feeling ($M_{fel}$), end of a feeling ($E_{fel}$), beginning of a scenario ($B_{sce}$), middle of a scenario ($M_{sce}$), end of a scenario ($E_{sce}$), beginning of a human audience ($B_{hum}$), middle of a human audience ($W_{hum}$), end of a human audience ($E_{hum}$), and no label (O). The sequential beginning, middle, and end of a same type of label form the corresponding tag. For example, a sequential $B_{bra}$-(zero, one or more) $M_{bra}$-$E_{bra}$ forms a brand tag, the $B_{att}$-(zero, one or more) $M_{att}$-$E_{att}$ forms a product industrial attribution tag, etc.

In certain embodiments, the CRF layer is configured to learn constraint between labels by maximizing a sentence labeling score, and the sentence labeling score for each of the plurality of sentence predictions is calculated by:

$$s(X,y) = \Sigma_{i=0}^{n} A_{y_i,y_{i+1}} + \Sigma_{i=1}^{n} P_{i,y_i},$$

where X is one of the documents and comprises n number of words $x_1, x_2, \ldots, x_n$, Y is predicted label sequence of the one of the documents and comprises $y_1, y_2, \ldots, y_n$, $A_{y_i,y_{i+1}}$ is a matrix of transition score representing transition from the label $y_i$ to the label $y_{i+1}$, and $P_{i,y_i}$ is a possibility of the i-th word in the documents having the label $y_i$.

In certain embodiments, the sentence labeling score for each of the sentence predictions is normalized by:

$$p(y \mid X) = \frac{e^{s(X,y)}}{\Sigma_{\tilde{y} \in Y_x} e^{(X,\tilde{y})}},$$

where p(y|X) is a normalized possibility for the document X relative to the label y, ỹ is any one of the predicted labels of the documents.

In certain embodiments, the computer executable code is further configured to: provide the updated tags as keywords of the corresponding products, such that a user can use the keywords to find the corresponding products via a search engine.

In certain embodiments, the computer executable code is further configured to: provide the updated tags as keywords of the corresponding products, and displaying the keywords on a homepage of the corresponding products as comment tags or title words.

In certain aspects, the present disclosure relates to a method for lifelong learning of tags. In certain embodiments, the method includes:

retrieving, by a computing device, product descriptions of products, and providing a plurality of seed tags, where the product descriptions include text or words identical or directly correspond to the seed tags, and the seed tags characterize at least one of the products;

training, by the computing device, a named-entity recognition (NER) model using the product descriptions and the seed tags;

predicting, by the computing device, pseudo tags from the product descriptions using the NER model;

calculating, by the computing device, confidence scores of the pseudo tags;

comparing, by the computing device, each of the confidence scores with a threshold, and defining each pseudo tag as a true tag if the confidence scores of the pseudo tag equals to or is greater than the threshold;

adding, by the computing device, the true tags to the seed tags to obtain updated tags; and repeating, by the computing device, the steps of training, predicting, calculating, comparing and adding using the product descriptions and the updated tags, so as to keep updating the updated tags.

In certain embodiments, the NER model comprises a bidirectional encoder representations from transformers (BERT) layer, a bidirectional long short-term memory (BiLSTM) layer, and a conditional random field (CRF) layer.

In certain embodiments, the confidence score of each of the pseudo tags is a number of detections of the pseudo tags from the product descriptions.

In certain embodiments, the tags belong to different types, and the types of tags include brand tags indicating brands of the products, industrial attribution tags indicating important physical features of the products, function tags indicating functions of the products, style tags indicating styles of the products, feeling tags indicating impression of customers to the products, scenario tags indicating suitable scenarios for using the products, and audience tags indicating targeted customers of the products. In certain embodiments, the threshold is 2-3 for the brand tags, 5-20 for the industrial attribution tags, the style tags, the audience tags, and the scenario tags, and 10-50 for the feeling tags.

In certain embodiments, each of the product descriptions has at least one sentence, each character in each sentence has a label. The NER model is configured to provide a label for each character of the product descriptions, the labels include beginning of a brand ($B_{bra}$), middle of a brand ($M_{bra}$), end of a brand ($E_{bra}$), beginning of a product industrial attributions ($B_{att}$), middle of a product industrial attribution ($M_{att}$), end of a product industrial attribution ($E_{att}$), beginning of a function ($B_{fun}$), middle of a function ($M_{fun}$), end of a function ($E_{fun}$), beginning of a style ($B_{sty}$, middle of a style ($M_{sty}$), end of a style ($E_{sty}$), beginning of a feeling ($B_{fel}$), middle of a feeling ($M_{fel}$), end of a feeling ($E_{fel}$), beginning of a scenario ($B_{sce}$), middle of a scenario ($M_{sce}$), end of a scenario ($E_{sce}$), beginning of a human audience ($B_{hum}$), middle of a human audience ($M_{hum}$), end of a human audience ($E_{hum}$), and no label (O), and the labels are used to generate the tags.

In certain embodiments, the CRF layer is configured to learn constraint between labels by maximizing a sentence labeling score, and the sentence labeling score for each of the sentence predictions is calculated by:

$$s(X,y) = \Sigma_{i=0}^{n} A_{y_i,y_{i+1}} + \Sigma_{i=1}^{n} P_{i,y_i},$$

where X is one of the documents and comprises n number of words $x_1, x_2, \ldots, x_n$, Y is predicted label sequence of the one of the documents and comprises $y_1, y_2, \ldots, y_n$, $A_{y_i,y_{i+1}}$ is a matrix of transition score representing transition from the label $y_i$ to the label $y_{i+1}$, and $P_{i,y_i}$ is a possibility of the i-th word in the documents having the label $y_i$.

In certain embodiments, the sentence labeling score for each of the plurality of sentence predictions is normalized by:

$$p(y \mid X) = \frac{e^{s(X,y)}}{\Sigma_{\tilde{y} \in Y_x} e^{(X,\tilde{y})}},$$

where p(y|X) is a normalized possibility for the document X relative to the label y, ỹ is any one of the predicted labels of the documents.

In certain embodiments, the method further includes:
providing the updated tags as keywords of the corresponding products, such that a user can use the keywords to find the corresponding products via a search bar; or
providing the updated tags as keywords of the corresponding products, and displaying the keywords on a homepage of the corresponding products as comment tags or title words.

In certain aspects, the present disclosure relates to a non-transitory computer readable medium storing computer executable code. In certain embodiments, the computer executable code, when executed at a processor of a computing device, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein:

FIG. 5A schematically depicts a product search interface according to certain embodiments of the present disclosure.

FIG. 5B schematically depicts organization of customer comments according to certain embodiments of the present disclosure.

FIG. 5C schematically depicts short titles of products according to certain embodiments of the present disclosure.

FIG. 7 schematically depicts a pseudocode of a scalable tag learning algorithm according to certain embodiments of the present disclosure.

FIG. 8 schematically depicts an example of tag learning from old products according to certain embodiments of the present disclosure.

FIG. 9 schematically depicts an example of tag learning from new products according to certain embodiments of the present disclosure.

DETAILED DESCRIPTION

Figure 1:
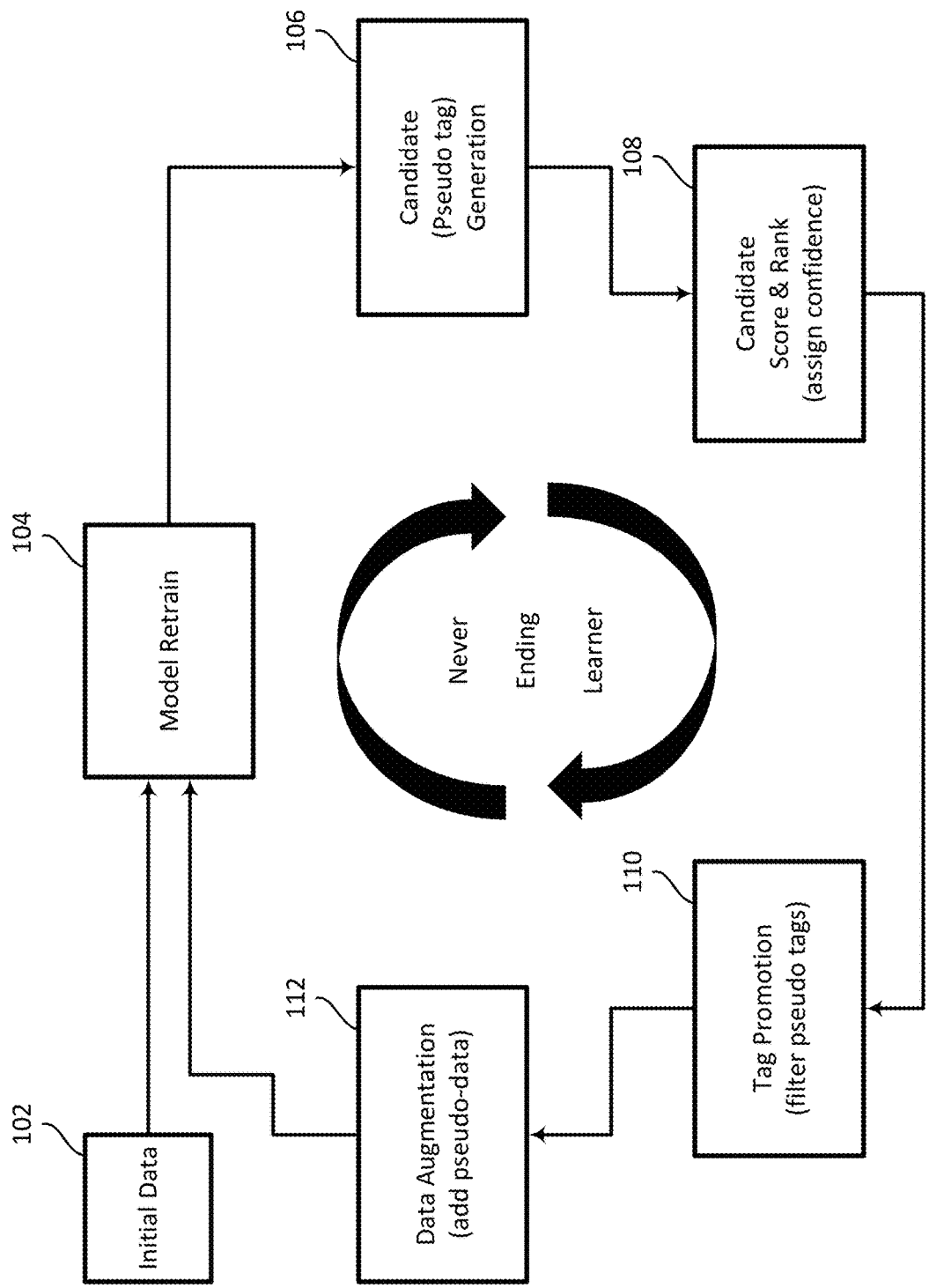
FIG. 1 schematically depicts an architecture of a lifelong tag learning system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. As used herein, the terms "comprising," "including," "carrying," "having," "containing," "involving," and the like are to be understood to be open-ended, i.e., to mean including but not limited to.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control. As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure relates to a system that automatically learns good and accurate tags from product description text at scale. In certain embodiments, the disclosure considers tag learning task as a named-entity recognition (NER) problem, and treats named-entities as tags. NER is a subtask of information extraction that seeks to locate and classify named entities mentioned in unstructured text into pre-defined categories such as person names, organizations, locations, etc. In e-commerce websites, named entities are different, the meaningful tags can be defined as product industrial attributions, functions, sale points, audience, and scenario of goods.

To solve the special "NER" problem in e-commerce, the main challenge is the scalability, which requires learning meaningful tags for new product from its description text without any human's annotation. Another challenge is precision and recall of tag prediction. Unlike tradition NER problem where the named-entity is usually noun, the present disclosure define named-entity to include noun, adjective, phrase, which increases difficulty of accurate and complete recognition. A further challenge is that, for Chinese e-commerce websites, like JD.com, Taobao, Chinese NER problem are more challenging than English NER problem, due to interference of Chinese word segmentation and polysemy.

The system and models according to certain embodiments of the present disclosure, among other things, solve the above mentioned challenges by the following design. (1) The present disclosure provides a lifelong tag learning system that can automatically learn tags for tens of thousands of product items in e-commerce in a never-ending style by iteratively optimizing the model and accumulatively promoting meaningful tags, leading to learn complete and accurate tags for existing and new-emerging products. (2) The present disclosure provides a high precision, high recall, and scalable tag-learning algorithm that can differentially deal with various types entities of noun, adjective, and phrases. (3) The present disclosure provides an NER model that includes BERT+BiLSTM+CRF layers. The layered architecture can release the interference of polysemy and word segmentation, and provide high precision named-entity recognition.

FIG. 1 schematically depicts an architecture of a lifelong tag learning system according to certain embodiments of the present disclosure. As shown in FIG. 1, with an initial data 102 having a collection of product descriptions and some initial seed tags of the products extracted from the product descriptions, a five step tag-learning iteration includes model training 104, candidate generation 106, candidate scoring and ranking 108, tag promotion 110, and data augmentation 112. Specifically, the initial data 102 includes product descriptions for many products, each product may be a narrow product category, such as T-shirt, skirt, and jeans from garments, TV, refrigerator, washer, and microwave from appliance, desk, sofa, and bed from furniture, and essence, lipstick, and fragrant from makeup. Each product, such as T-shirt, may have thousands of descriptions, and some of the products have the initial seed tags. The number of the seed tags may be limited, and some of the products may have no seed tags. The product descriptions and the seed tags are used to generate a training dataset, and the training dataset is used for model training 104. The model may be an NER model. The trained model is then used to predict tags at step 106 from the product descriptions, to obtain candidate or pseudo tags. Then at step 108, the pseudo tags are assigned with confidence scores, and ranked using the confidence scores. At step 110, the ranked pseudo tags are filtered, for example by threshold values, and the pseudo tags with high confidence scores are promoted to be true tags. The true tags are added to the seed (bootstrap) tags at step 112, and the data are augmented with the new added tags. The augmented data can then be used for another model training 104. The steps of 104-112 are iterated until no new tags are learned, or the number of tags meets a predefined number. Further, whenever new products and their descriptions are added to the data, the iterative steps can be performed to obtain tags for those new products. In certain embodiments, the leaned tags can be used by other modules or applications.

Figure 2:
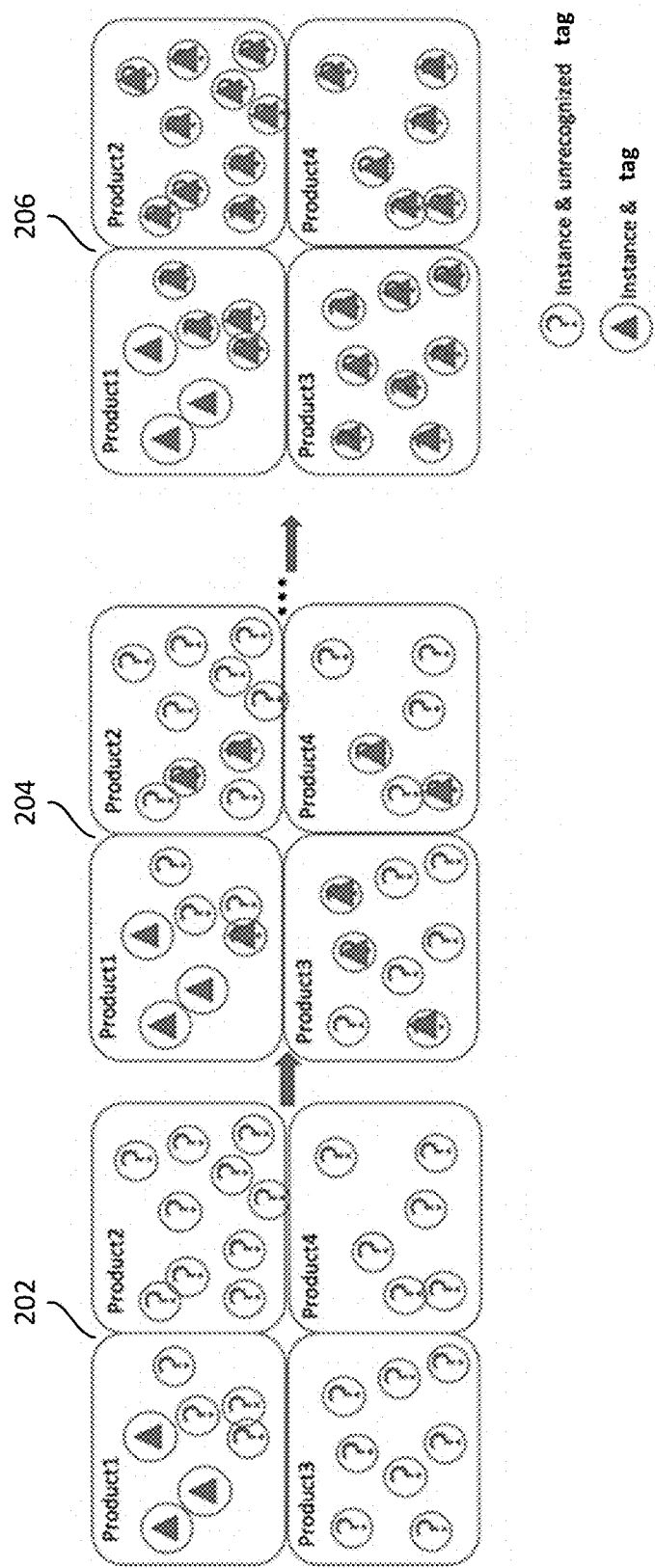
FIG. 2 schematically depicts automatic tag learning from product descriptions according to certain embodiments of the present disclosure.

FIG. 2 schematically depicts automatic learning accurate tags from product description according to certain embodiments of the present disclosure. The learning is scalable, and may be performed by the steps shown in FIG. 1. As shown in FIG. 2, there are four products 1-4. Each product may be a narrow product category such as T-shirt or TV, and each product has a lot of product description text. Each description text is shown by a circle, and is also called an instance. The triangle in the circles represents tags identified from the corresponding instance, and the question marks in the circles are unrecognized tags in the corresponding instance. Unlike traditional NER model, certain embodiments of the present disclosure uses a life-long learning framework to optimize its model iteratively and learn tags in a never-ending style, so it can increase the recall of the tag learning for existing products and scale to new products without any human's participation. At the initial state 202, there are a handful tags for the product 1 (seed tags), and there is no tags for the products 2-4. After an iteration of learning tags, at the state 204, there are more tags identified for the product 1 in addition to the seed tags, and there are also some tags identified for the products 2-4. The process can be performed for many iterations, and at state 206, all the tags for the products 1-4 are identified.

Figure 3:
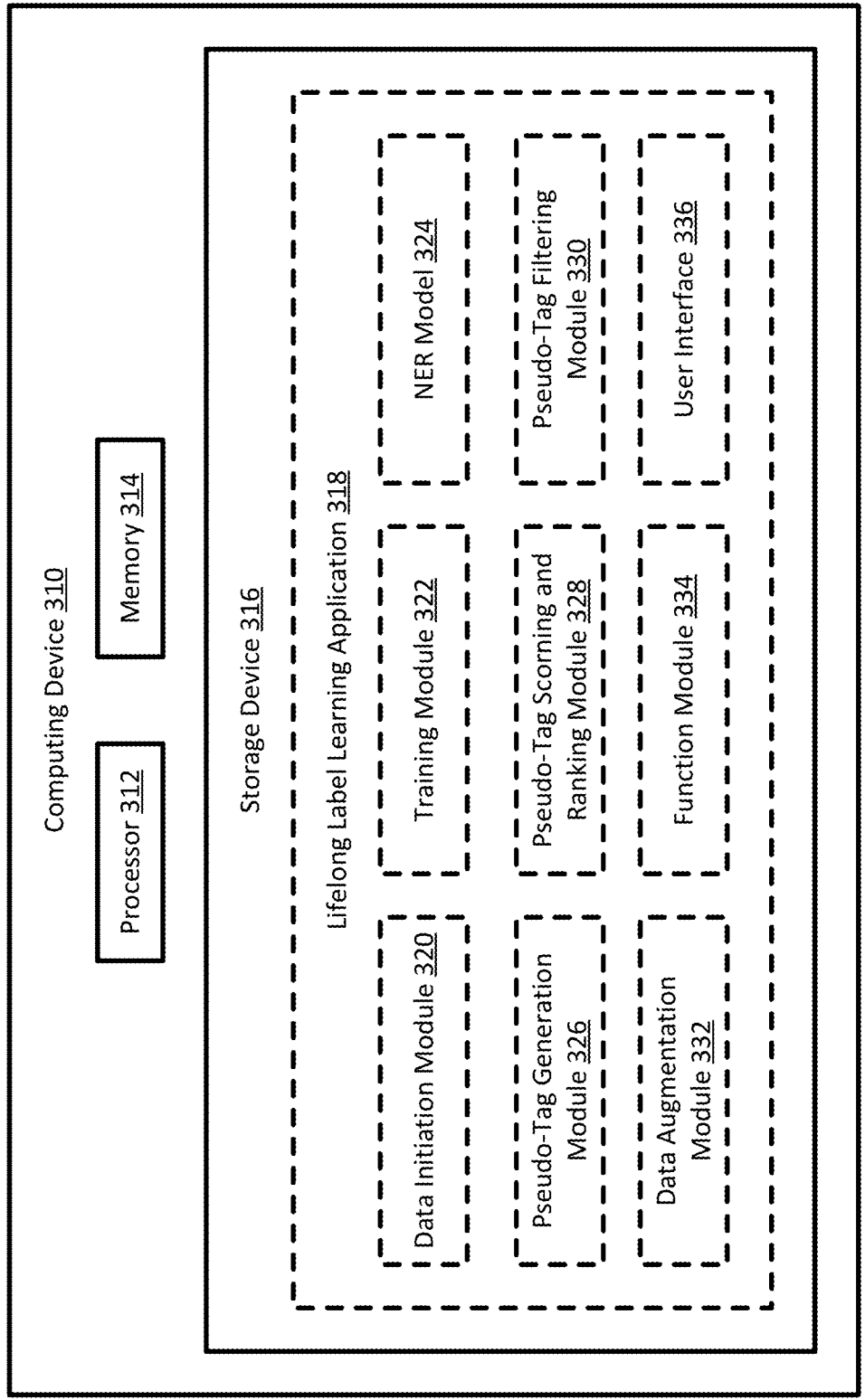
FIG. 3 schematically depicts a system for lifelong tag learning according to certain embodiments of the present disclosure.

FIG. 1 and FIG. 2 are brief description of the disclosure concept according to certain embodiments, and more details are provided as follows. FIG. 3 schematically depicts a system for lifelong tag learning according to certain embodiments of the present disclosure. As shown in FIG. 3, the system 300 includes a computing device 310. In certain embodiments, the computing device 310 may be a server computer, a cluster, a cloud computer, a general-purpose computer, a headless computer, or a specialized computer. The computing device 310 may include, without being limited to, a processor 312, a memory 314, and a storage device 316. In certain embodiments, the computing device 310 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 312 may be a central processing unit (CPU) which is configured to control operation of the computing device 310. In certain embodiments, the processor 312 can execute an operating system (OS) or other applications of the computing device 310. In certain embodiments, the computing device 310 may have more than one CPU as the processor, such as two CPUs, four CPUs, eight CPUs, or any suitable number of CPUs. The memory 314 may be a volatile memory, such as the random-access memory (RAM), for storing the data and information during the operation of the computing device 310. In certain embodiments, the memory 314 may be a volatile memory array. In certain embodiments, the computing device 310 may run on more than one processor 312 and/or more than one memory 314. The storage device 316 is a non-volatile data storage media or device. Examples of the storage device 316 may include flash memory, memory cards, USB drives, solid state drives, or other types of non-volatile storage devices such as hard drives, floppy disks, optical drives, or any other types of data storage devices. In certain embodiments, the computing device 310 may have more than one storage device 316. In certain embodiments, the computing device 310 may also include a remote storage device 316.

The storage device 316 stores computer executable code. The computer executable code includes a lifelong tag learning application 318. The lifelong tag learning application 318 includes the code or instructions which, when executed at the processor 312, may perform tag learning iteratively. In certain embodiments, the lifelong tag learning application 318 may not be executable code, but in a form of circuit corresponding to the function of the executable code. By providing a circuit instead of executable code, the operation speed of the lifelong tag learning application 318 is greatly improved. In certain embodiments, as shown in FIG. 3, the lifelong tag learning application 318 includes, among other things, a data initiation module 320, a training module 322, an NER model 324, a pseudo-tag generation module 326, a pseudo-tag scoring and ranking module 328, a pseudo-tag filtering module 330, a data augmentation module 332, a function module 334, and a user interface 336.

The data initiation module 320 is configured to provide initial dataset for training the NER model 324 and allowing the NER model 324 to predict new tags from. The initial dataset includes multiple products, product descriptions for each of the products, and seed tags extracted from some of the product descriptions. Each product here is a narrow category of products, such as T-shirt, shoes, microwave, and TV, and specific products in the category are named goods. Thus, each product may correspond to thousands of specific goods or stock-keeping units (SKUs), and may include thousands of product descriptions retrieved from those specific goods. The seed tags are provided corresponding to certain of the product descriptions, and the number of seed tags may be in a range of ten to a few hundreds. The seed tags include the types of product brand, product industrial attributions, product functions, product style, product feeling, product scenario, and product audience. The product brand indicates brands of the goods, such as NIKE, SIEMENS, HAIER The product industrial attributions indicate important physical features of the goods that are usually provided by the manufactures, and include pure color, level 1, black, parquet, brown, golden silk, curly willow, blue, thickening, printing, metal handle, stripe, stainless steel, white, painted surface, tempered glass, stitching, double doors, antique finishing, hollow, red sandalwood, golden, green, yellow, 3D, gray, etc. The product functions indicate functions of the goods and include all-match, formaldehyde-free, comfortable, large capacity, mildew proof, durable, dustproof, silent, zero formaldehyde, space saving, anticorrosion, etc. The product style includes Chinese style, European style, European and American style, Japanese style, Korean style, classic, trend, minimalist, artsy, sporty, retro, casual, etc. The product feeling includes lightweight, beautiful, concise, fashion, luxury, popular, smooth, elegant, fresh, high value, high end, simple, warm, etc. The product scenario indicates suitable scenarios for using the products, such as home, office, nature, study, vacation, living room, dining room, etc. The product audience indicates targeted customers of the product, such as female, male, children, teenagers, senior, teacher, pregnant woman, etc. In certain embodiments, the above types of tags are predefined.

The training module 322 is configured to, at the initial of the lifelong learning application 318, train the NER model 324 using the initial dataset provided by the data initiation module 320, and inform the pseudo-tag generation module 326 that the NER model 324 is well-trained using the current dataset; and after the initialization, retrain the NER model 324 using augmented dataset prepared by the data augmentation module 332, and inform the pseudo-tag generation module 326 that the NER model 324 is well-trained using the current dataset.

Figure 4:
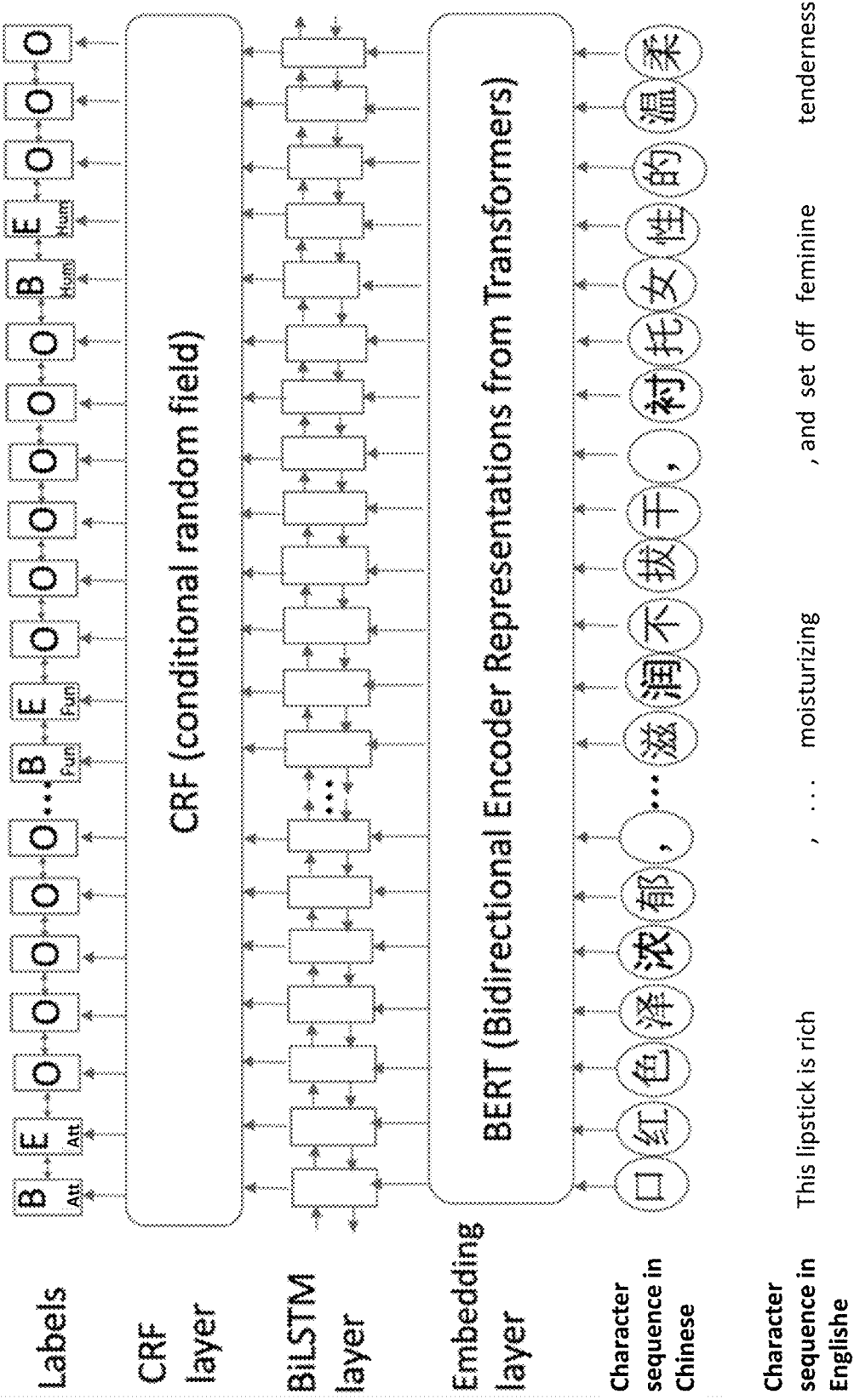
FIG. 4 schematically depicts a name-entity recognition model according to certain embodiments of the present disclosure.

The NER model 324 is configured to be trained iteratively using the current available datasets in response to an instruction from the training module 322, and is configured to predict tags from the current available datasets in response to an instruction from the pseudo-tag generation module 326. FIG. 4 schematically depicts an NER model network architecture according to certain embodiment of the disclosure. As shown in FIG. 4, the NER model includes sequentially a bidirectional encoder representations from transformers (BERT) embedding layer, a bidirectional long short-term memory (BiLSTM) layer, and a conditional random field (CRF) layer. The input of the model is a sentence, e.g., a Chinese character sequence of a product description. The output is a label sequence, and each label in the sequence is a label classification of each character, e.g., beginning of a brand ($B_{bra}$), middle of a brand ($M_{bra}$), end of a brand ($E_{bra}$), beginning of a product industrial attributions ($B_{att}$), middle of a product industrial attribution ($M_{att}$), end of a product industrial attribution ($E_{att}$), beginning of a function ($B_{fun}$), middle of a function ($M_{fun}$), end of a function ($E_{fun}$), beginning of a style ($B_{sty}$), middle of a style ($M_{sty}$), end of a style ($E_{sty}$), beginning of a feeling ($B_{fel}$), middle of a feeling ($M_{fel}$), end of a feeling ($E_{fel}$), beginning of a scenario ($B_{sce}$), middle of a scenario ($M_{sce}$), end of a scenario ($E_{sce}$), beginning of a human audience ($B_{hum}$), middle of a human audience ($M_{hum}$), end of a human audience ($E_{hum}$), and no label (O). Kindly note the tags are extracted afterwards, and an attribute tag would include the characters or words of sequential $B_{att}$, $M_{att}$, and $E_{att}$; a function tag would include the characters or words of sequential $B_{fun}$, $M_{fun}$, $E_{fun}$. Thus, three tags can be extracted from the labeled sentence shown in FIG. 4, and the three tags are an attribute tag, a functional tag, and a human audience tag.

The embedding layer adopts BERT. BERT is designed to pretrain deep bidirectional representations from large-scale unlabeled text by jointly conditioning on both left and right context in all layers, a polysemous word will be embedded into several difference vectors depending on its semantics and context. Because BERT considers both left and right context for a word embedding, it can accurately represent word semantics, so it can deal with the interference of Chinese segmentation and polysemy.

The second layer is the Bi-LSTM layer. Long short-term memory (LSTM) is an artificial recurrent neural network (RNN) architecture. LSTM's unit is composed of a cell, an input gate, an output gate, and a forget gate. The cell remembers values over arbitrary time intervals and the three gates regulate the flow of information into and out of the cell. LSTM partially solves the vanishing gradient problem because it allows gradients to also flow unchanged. Further, Bi-LSTM uses two directions, input information in a sentence from the left and right context of the current character can be used. Accordingly, BiLSTM can accurately represent and memorize word dependency in a long sentence.

The last layer is the CRF layer, which is advantages over Softmax in the present disclosure. A Softmax layer for classification only labels each character independently. In contrast, CRF can learn constraint for sequence labelling task and take sequential dependencies into account. For example, "$E_{bra}$" cannot follow "$B_{fun}$" in a sentence, but Softmax doesn't know. On the contrary, the CRF layer can use sentence-level label information and model the transition behavior of each two different labels, and learn constraint between labels. Specifically, the CRG layer is configured to maximize a sentence labeling score to learn constraints between the neighboring labels in a sentence. In certain embodiments, the score of each sentence labeling is calculated by:

$$s(X,y)=\Sigma_{i=0}^{n}A_{y_i,y_{i+1}}+\Sigma_{i=1}^{n}P_{i,y_i}$$

X is an input sentence of the product descriptions, and the sentence X includes n number of words $x_1, x_2, \ldots, x_n$. Y is a predicted label sequence of the sentence, and includes the word or character labels $y_1, y_2, \ldots, y_n$. A is a matrix of transition scores, such that $A_{y_i,y_{i+1}}$ represents the score of a transition from the label $y_i$ to the label $y_{i+1}$. $y_0$ and $y_n$ are the start and the end labels of the sentence. P is the matrix of scores outputted by the BiLSTM layer, and $P_{i,y_i}$ corresponds to the score of the $y_i$ label of the i-th word. For example, if a sentence includes 6 characters, that is, n=6, the sentence can be defined as "Start-character 1-character2-chracter 3-character 4-character 5-chracter 6-End." The transition relation thus is 7, from transition of "Start to character 1," to transition of "character 6 to End." In certain embodiments, the CRF layer of a post processing of the CRF layer further normalizes the scores of the possible sentence labeling y of the sentence X A probability over all possible sentence labeling (label sequences) by normalized exponential function (e.g., softmax function) is defined by:

$$p(y\mid X) = \frac{e^{s(X,y)}}{\Sigma_{\tilde{y}\in Y_x}e^{s(X,\tilde{y})}}.$$

p(y|X) is a normalized possibility for the sentence X relative to the label y, ỹ is any one of the predicted sentence labeling. The one sentence labeling having the highest score is regarded as the correctly sentence labeling prediction, and the sentence labeling prediction is compared with the ground truth tags to obtain the parameters of the transition matrix A. After training, the output of BiLSTM and the transition matrix can be used by the CRF to obtain labels of the sentences.

In summary, the novel model structure prevents interference of word segmentation and polysemy, and can identify the entities of various word and phrase. Specifically, BERT is a word embedding based on context, it can solve polysemy problem because a word has different embeddings based on its semantics if it has several meanings; BiLSTM can capture both left and right context, accurately represent and memorize word dependency in a long sentence; and CRF can learn constraint for sequence labelling, and accurately represent label dependencies. As a result, the NER model 324 increases the precision of tag learning by using the network architecture of BERT+BiLSTM+CRF, and solves the problem of polysemy and word segmentation.

The pseudo-tag generation module 326 is configured to, upon receiving the sentence labeling from the NER model 324, extract the word labels to form pseudo-tags of the dataset, and send the pseudo-tags to the pseudo-tag scoring and ranking module 328.

The pseudo-tag scoring and ranking module 328 is configured to, upon receiving the pseudo-tags, calculate a confidence score for each of the pseudo-tags, rank the pseudo-tags from each product using their confidence scores, and send the ranked pseudo-tags and their confidence scores to the pseudo-tag filtering module 330. For example, the product such as T-shirt may have thousands of description sentences, each word in the description sentences are labeled, tags are extracted from the labels, the same tag may exist in several different description sentences. Accordingly, for each pseudo-tag, the pseudo-tag scoring and ranking module 328 is configured to calculate a number of times that the same tag presents in different description sentences, and use the number as the confidence score of the pseudo-tag. The same type of pseudo-tags may also be grouped together, such that each type of tags have a pseudo-tag rank list according to their confidence scores. For example, for product 1 such as T-shirt, the brand type of tags may have a rank, the audience type of tags may have another rank, and the scenario type of tags may have a further rank; and for product 2 such as TV, the brand type of tags may have a rank, the function type of tags may have another rank, and the scenario type of tags may have a further rank. However, the ranking may not be necessary.

The pseudo-tag filtering module 330 is configured to, upon receiving the ranked pseudo-tags and their confidence scores from the pseudo-tag scoring and ranking module 328, filter the pseudo-tags to obtain filtered tags, and add the filtered tags to the current true tags of the product. In certain embodiments, the filtering is performed by comparing the confidence scores of the pseudo-tags with predefined threshold. When the confidence score of a pseudo-tag equals to or is greater than the threshold, the pseudo-tag is regarded as a true tag. In certain embodiments, the predefined threshold for different types of tags have different values. For example, the threshold for the brand tags may be 2 or 3, while the threshold for the human feelings may be in the range of 5-20, for example 10. In certain embodiments, threshold of the same types of tags for different types of products may be different. In certain embodiments, the threshold for the same type of tag may vary in different iteration of the lifelong learning, where the threshold value may increase in a later iteration when there are already a lot of available tags for the products.

The data augmentation module 332 is configured to, when the filtered pseudo-tags are added as true tags, prepare updated dataset, and inform the training module 322 that the dataset has been updated, such that the training module 322 can start retraining of the NER model 324. The updated dataset include the products, the product descriptions, and the updated tags. In certain embodiments, new product with new product descriptions and optionally new tags can be added to the updated dataset before an iteration of retraining of the NER model 324. In certain embodiments, the data augmentation module 332 is further configured to stop the iteration when there is no new filtered pseudo-tags for a product, or the number of the new filtered pseudo-tags is less than a predetermined number for a product, or the total number of true tags for a product equals to or is greater than a predefined expected value.

The function module 334 is configured to, when the lifelong learning is performed for a while, use the current tags to perform a specific function or task. In certain embodiments, the function is product search in an e-commerce website. As shown in FIG. 5A, in a search interface 500A, a search bar is provided at the top to perform a search under household appliance and large appliance, recommended search terms are listed under the search bar. The searchable terms for brand include SIEMENSE, HAIER, ZF, MI, VINOCAVE, LITTLESWAN, EKEA, and SKYWORTH. The searchable terms for screen size include 78 inches & up, 70-75 inches, 65 inches, 58-60 inches, and 55 inches & under. The searchable terms for washing capacity is 20 kg and up, 10-20 kg, 9.1-9.9 kg, 9 kg, and 8.1-8.9 kg. The searchable terms for frequency include constant frequency and variable frequency. The advanced searchable terms are divided into heating and cooling type, motor type, height, energy efficiency rating, and product feature. The terms under product feature include smart air conditioner, automatic-cleaning, quiet air conditioner, cylindrical air conditioner, independent dehumidification, and easy to take part and wash. When the product tags from the lifelong learning is available, the function module 334 is configured to add the tags or the added tags to the terms of the search interface, and link the terms to the product having the tags. Accordingly, when the customer searched the term of the learned tag, the product having the learned tag can be provided to the customer. In certain embodiments, the learned tags may be, for example, the terms under the "product feature" of the "advanced" option.

In certain embodiments, the function is to provide tags for customers' comments so as to organize the customer comments. As shown in FIG. 5B, in a comment page 500B of a product, comments tags are provided, and each comment tag corresponds to certain number of customer comments that have the comment tag. The comment tag can be, for example, suitable size, fast open/close, elegant appearance, good clarity, full-automatic and intelligent, beautiful and high-end, easy to control, suitable for living room, comfortable, clear voice, convenient, and must haves for home theater. When the product tags from the lifelong learning is available for comment descriptions of the product, the function module 334 is configured to add the tags as comment tags, and link the comment tags with the comments having the comment tags. Accordingly, when the customer clicks a comment tag, the comments having the tag will be displayed to the customer. In certain embodiments, the learned tags may be, for example, "full-automatic and intelligence," "beautiful and high-end," and "must haves for home theater."

In certain embodiments, the function is to provide short titles for a product so that the customer can see the important features of the product from its title. As shown in FIG. 5C, in product pages 500C, short titles are provided for different goods, and the short title include tags of important features of the product. The short titles may be, for example, "MEIDI fast microwave" for a microwave, "NIKE rebound cushioning AJ1 basketball shoes" for a pair of shows, and "TOREAD waterproof multiple pockets . . . " for a jacket. When the product tags from the lifelong learning are available for descriptions of the product, the function module 334 is configured to extract tags from description of a goods, and add the tags to the short title of the goods, and display the short title and the image of the goods in its homepage or in a search result. In certain embodiments, the function module 334 is configured to add tags of the goods that have high confidence scores. In certain embodiments, the function module 334 is configured to choose one high confidence score tag from each of a few tag types. Accordingly, when the customer views the homepage of a goods, the short title would provide the most important information to the customer. In certain embodiments, the added tags may include the "fast" and "rebound cushioning" shown in FIG. 5C.

The user interface 336 is configured to provide a user interface or graphic user interface in the computing device 310. In certain embodiments, the user or the administrator of the system is able to configure parameters for the computing device 310, especially the parameters used in the lifelong tag learning application 318 using the interface 336. The parameters may include when and how to input new product and new product descriptions, when to stop the lifelong learning, thresholds in different iterations of learning, and when to perform a function.

Figure 6:
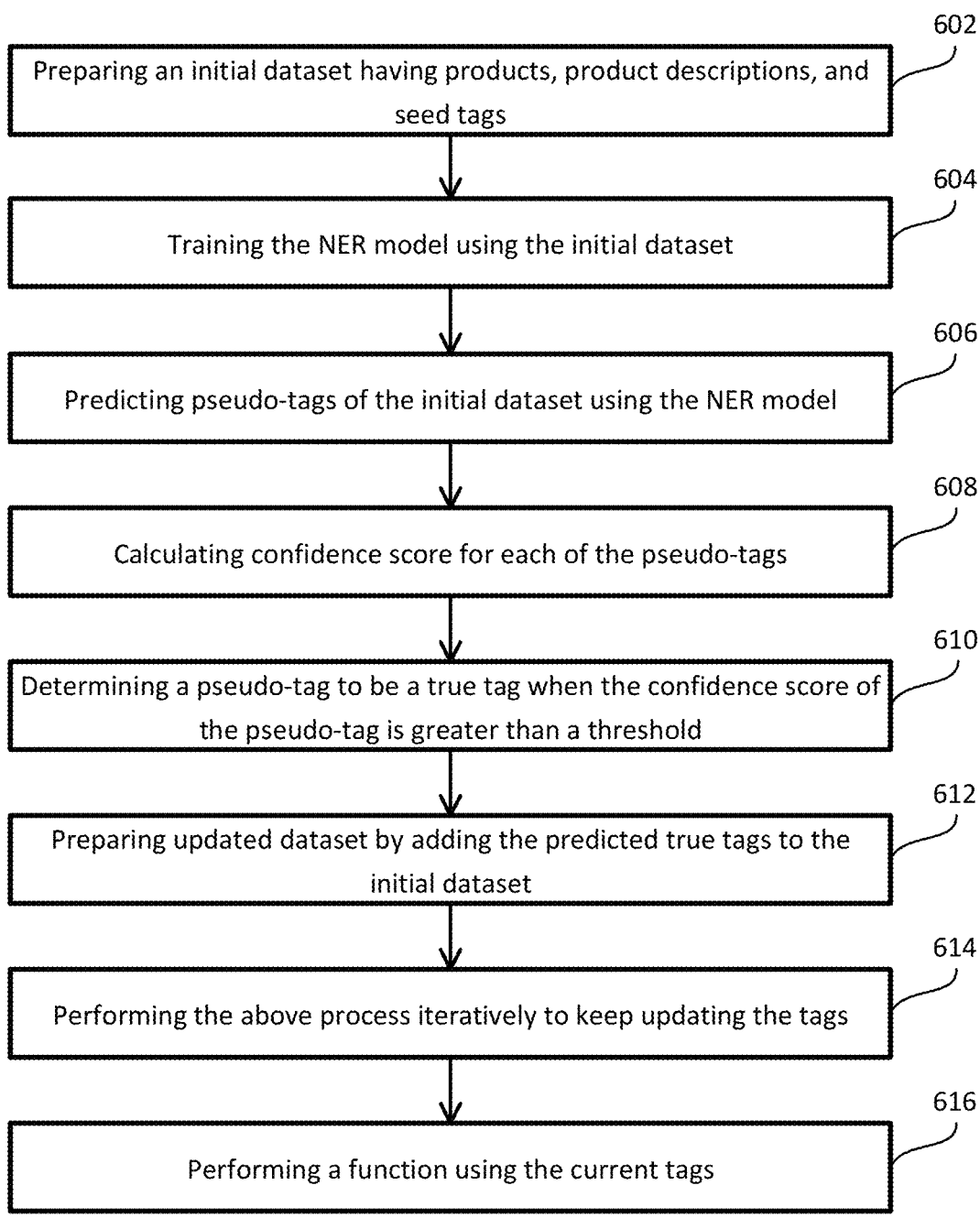
FIG. 6 schematically depicts a method for lifelong tag learning according to certain embodiments of the present disclosure.

FIG. 6 schematically depicts a method for lifelong tag learning according to certain embodiments of the present disclosure. In certain embodiments, the method 600 as shown in FIG. 6 may be implemented on a computing device 310 as shown in FIG. 3. It should be particularly noted that, unless otherwise stated in the present disclosure, the steps of the method may be arranged in a different sequential order, and are thus not limited to the sequential order as shown in FIG. 6.

At procedure 602, the data initial module 320 prepares an initial dataset. The initial dataset includes many products, each product has many product descriptions, and some tags for some products are provided, which come from corresponding of the product descriptions. The tags are called seed tags.

At procedure 604, the training module 322 trains the NER model 324 using the initial dataset, and informs the pseudo-tag generation module 326 when the NER model 324 is well trained. In certain embodiments, the training of the NER model 324 is performed using the seed tags, the corresponding products the seed tags refers to, and the product descriptions containing the seed tags.

At procedure 606, in response to receiving the information from the training module 322 that the NER model 324 is well trained, the pseudo-tag generation module 326 instructs the NER model 324 to make predictions using the initial dataset, and the NER model 324, after prediction, sends the labeled sentences to the pseudo-tag generation module 326. Each of the labeled sentences includes labels for each word or character in the sentence. When the sentences are in English, the labels are for the words, and when the sentences are in Chinese, the labels are for the characters. Some words in the sentence are labeled with "O," which means that the NER model 324 cannot predict a meaningful label for the words or characters. After that, the pseudo-tag generation module 326 extracts the tags of the words or characters from the labeled sentences, and sends the tags to the pseudo-tag scoring and ranking module 328. The tags for the words or characters are named pseudo-tags.

At procedure 608, upon receiving the pseudo-tags, the pseudo-tag scoring and ranking module 328 calculates a confidence score for each pseudo-tag, optionally ranks the pseudo-tags based on the confidence score, and sends the pseudo-tags, their confidence scores, and optionally the rank to the pseudo-tag filtering module 330. In certain embodiments, the confidence score is the number of appearances of the pseudo-tag in the sentences for a product. For example, for the product of T-shirt, there may be 1,000 product description sentences, and one pseudo-tag is identified in two of the 1,000 product description sentences, then the confidence score of the pseudo-tag is 2.

At procedure 610, upon receiving the pseudo-tags, the confidence scores of the pseudo-tags, and optionally the ranking, the pseudo-tag filtering module 330 compares the confidence scores with predefined thresholds, determines the pseudo-tags with confidence scores higher than the predefined thresholds as true tags, and sends the true tags to the data augmentation module 332. In certain embodiments, the threshold for brand tags is 2, and the threshold for customer feeling is 10.

At procedure 612, upon receiving the true tags, the data augmentation module 332 add the true tags to the current tags to obtain updated tags, and prepares an updated dataset. The updated dataset includes the product, the product descriptions, and the updated tags.

At procedure 614, the training module 322 trains the NER model 324 using the updated dataset; after retraining, the NER module 324 and the pseudo-tag generation module 326 generate new pseudo-tags; the pseudo-tag scoring and ranking module 328 calculates confidence scores for each of the new pseudo-tags; the pseudo-tag filtering module 330 compares the confidence scores with the corresponding thresholds to obtain new true tags; and the data augmentation module 332 prepares updated dataset by adding the new true tags. The above process thus can be iteratively performed, with lifelong updates of the tags.

In certain embodiments, new product and new product descriptions, with or without tag, can be added to the augmented dataset, such that tags for the new product can be updated.

In certain embodiments, the different rounds of iterations may use different thresholds, where a later iteration may use higher thresholds than a previous iteration.

In certain embodiments, the iterations may also be stopped when there is no or a few true tags can be obtained in the recent iteration, or when a predefined number of tags for the products are obtained.

At procedure 616, during the iterations of the above process or when the iteration is stopped because predetermined criteria are met, the function module 334 performs a function. In certain embodiments, the function is search, and the function module 334 retrieves the current tags, adding the current tags as searching terms to the search engine of the search function, and provide corresponding product and product descriptions as the search result when the tags are used as inputted search terms. Because the tag update is performed iteratively, the function module 334 may update the search terms at a predetermined time interval, so that the newly discovered true tags of the products can be added to the search term continuously.

In certain embodiments, the function is to provide tags for customer comments. The lifelong tag learning application 318 uses the product comments as product descriptions, mining new tags from the product comments, and the function module 334 adds the new tags as customer comments tags. The customer comments tags are linked to the customer comments containing the customer comments tags, such that the customer can easily see multiple comments with the same customer comments tag. For example, if the product is a home theatre, and the customer comment tag is "must haves for home theater," by clicking the tag "must haves for home theater," the customer can review all the related comments so that he can find out the specific features of the home theatre product that makes the product to be a "must have."

In certain embodiments, the function is to provide short titles for goods. The function module 334 can retrieve important tags for a product, uses these tags to create the short titles of the goods in the product category.

As described above, the iterative updating of tags are performed automatically. In certain embodiments, the function of the function module 334 is also performed automatically, such that certain applications provided by the e-commerce platform, such as the search, comments grouping, and short title creation can be achieved automatically.

FIG. 7 schematically depicts a pseudocode of a scalable tag-learning algorithm according to certain embodiments of the disclosure. As shown in FIG. 7, the input of the algorithm includes old product categories with seed tags, and new product categories having no tags (lines 2-6). The lifelong tag-learning is performed on both the old product and the new product (lines 10-11). The iterations of tag learning is performed according to lines 15-33, and the iteration can also be stopped if certain criteria are met (line 35). The algorithm shown in FIG. 7 can increase the tag number for old categories of products like a snowball; for new categories of products, it can learn tags without seed (bootstrap) tags and human's participation, because the knowledge can be transferred from old product to new product.

To guarantee the precision of tag learning, as shown in line 27, the disclosure calculates a confidence score for each pseudo-tag p, called Conf(p). If Conf(p) is higher than threshold t, then the pseudo-tag p can be promoted as true tag, and can be further added into the set of seed (bootstrap) tags. The disclosure can use the frequency of occurrence of the pseudo-tag p in the set of product description, higher frequent occurrence p is, more confident as a true tag. The tag-promotion threshold for each type of tags can be different and dynamical. For example, if the tag is product brand or product industrial attribution, this type of tag usually is proper noun, the threshold can be set as a low integer like 2, because we have confidence that the pseudo-tag should be true tag once it occurs in the product description texts. If the tag is human's feeling to a product, this type of tag usually is adjective, the threshold can be set as a high integer such as 10, because we can have confidence that the pseudo-tag is a true tag only if it repeatedly occurs in the product description texts many times.

To guarantee the recall of tag learning, the algorithm learns tags in a never-ending learning style. It will never end unless no new tags are learned or the tags meets the business requirement. Otherwise, the tag-learning process for old products will go on and on (a new product will become an old product after its first learn process), the learning process seems to like a snow ball, it can learn the meaningful tags as much as possible.

In a further aspect, the present disclosure is related to a non-transitory computer readable medium storing computer executable code. The code, when executed at a processor of a computing device, may perform the methods as described above. In certain embodiments, the non-transitory computer readable medium may include, but not limited to, any physical or virtual storage media. In certain embodiments, the non-transitory computer readable medium may be implemented as the storage device 316 of the computing device 310 as shown in FIG. 3.

Preliminary experimental results are shown for tag learning using several product items from JD.com. FIG. 8 shows the result for old products (e.g., garment, large-appliances). The column V0 is the initial number of bootstrap tags, with 1011 tags defined by product experts. V1, V2, V3, V4, and V5 show the number of new meaningful tags learned by the lifelong learning system for the first, second, third, fourth, and fifth iteration, which are 47, 76, 74, 85, and 65 new tags, respectively.

FIG. 9 show the result for new products (make-ups and furniture). There is no initial bootstrap tag for new product as shown in the column V0. We use the model optimized several times from the life-long tag learning system using the previous "old" product dataset, and generate the tags for these new product items, the column V1 shows the number of meaningful tags learned by the first iteration of lifelong learning. The results illustrate that it can learn tags for new product without any product experts' involvement via the life-long tag learning system. Some of the tags from the old product actually might be transferred to the new product from the well-trained model.

In summary, certain embodiments of the present disclosure, among other things, have the following advantages. (1) The disclosed method is an automatic lifelong learning method without the need of human interference, the lifelong learning can not only increase the number of tags for old products, but also learn tags from new products that have no tags at all in the beginning. By this type of design, the scalability of tag-learning is achieved. (2) The life-long learning feature of the present disclosure also ensures high recall of tags, and even for new trends in product description with emerging new terms, the disclosure can determine the emerging new terms as tags. (3) The precision of the tags is guaranteed by calculating the confidence scores of the pseudo-tags and comparing the confidence scores to the threshold values. Only the pseudo-tags having confidence scores equaling to or greater than the thresholds are determined as true tags. (4) Chinese words are composed of by Chinese characters, and segmentation of characters in the sentences into words is challenging. The BERT+BiLSTM+CRF layered model is a novel model structure suitable for Chinese language processing, which solves the Chinese segmentation and polysemy problem. Further, the disclosure is advantageous in solving problems in Chinese language NER, and it is also applicable to English and other languages. By the above features, the present disclosure achieves high precision, high recall, and scalable tag learning.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES (THE REFERENCES ARE INCORPORATED HEREIN BY REFERENCE IN THEIR ENTIRETY)

1. Jacob Devlin, Ming-Wei Chang, Kenton Lee, and Kristina Toutanova, BERT: Pre-training of deep bidirectional transformers for language understanding, 2018, arXiv: 1810.04805.
2. Bidirectional recurrent neural networks, Wikipedia, https://en.wikipedia.org/wikiBidirectional_recurrent_neural_networks.
3. Long short-term memory, Wikipedia, https://en.wikipedia.org/wiki/Long_short-term_memory.
4. Conditional random field, Wikipedia, https://en.wikipedia.org/wiki/Conditional_random_field.
5. Guillaume Lample, Miguel Ballesteros, Sandeep Subramanian, Kazuya Kawakami, and Chris Dyer, Neural architectures for named entity recognition, Proceedings of NAACL-HLT 2016, 2016, 260-270.
6. Ruixue Ding, Pengjun Xie, Xiaoyan Zhang, Wei Lu, Linlin Li, and Si Luo, A neural multi-digraph model for Chinese NER with gazetteers, Proceedings of the 57th Annual Meeting of the Association for Computational Linguistics, 2019, 1462-1467.
7. Pengfei Cao, Yubo Chen, Kang Liu, Jun Zhao, and Shengping Liu, Adversarial transfer learning for Chinese named entity recognition with self-attention mechanism, Proceedings of the 2018 Conference on Empirical Methods in Natural Language Processing, 2018, 182-192.
8. Yuying Zhu, and Guoxin Wang, CAN-NER: Convolutional attention network for Chinese named entity recognition, Proceedings of NAACL-HLT 2019, 2019, 3384-3393.
9. Emma Strubell, Patrick Verga, David Belanger, and Andrew McCallum, Fast and accurate entity recognition with iterated dilated convolutions, Proceedings of the 2017 Conference on Empirical Methods in Natural Language Processing, 2017, 2670-2680.

What is claimed is:

1. A system comprising a computing device, wherein the computing device comprises a processor and a storage device storing computer executable code, and the computer executable code, when executed at the processor, is configured to:

retrieve product descriptions of products and provide a plurality of seed tags, wherein the product descriptions comprise text identical to the seed tags and the seed tags characterize at least one of the products;

train a named-entity recognition (NER) model using the product descriptions and the seed tags;

predict pseudo tags from the product descriptions using the NER model;

calculate confidence scores of the pseudo tags;

compare each of the confidence scores with a threshold, and define one of the pseudo tags as a true tag when the confidence score of the pseudo tag is greater than the threshold;

add the true tags to the seed tags to obtain updated tags; and repeat the steps of training, predicting, calculating, comparing and adding using the product descriptions and the updated tags, so as to keep updating the updated tags, wherein the NER model is configured to provide a label for each character of the product descriptions, the labels comprises beginning of a brand ($B_{bra}$), middle of a brand ($M_{bra}$), end of a brand ($E_{bra}$), beginning of a product industrial attributions ($B_{att}$), middle of a product industrial attribution ($M_{att}$), end of a product industrial attribution ($E_{att}$), beginning of a function ($B_{fun}$), middle of a function ($M_{fun}$), end of a function ($E_{fun}$), beginning of a style ($B_{sty}$), middle of a style ($M_{sty}$), end of a style ($E_{sty}$), beginning of a feeling ($B_{fel}$), middle of a feeling ($M_{fel}$), end of a feeling ($E_{fel}$), beginning of a scenario ($B_{sce}$), middle of a scenario ($M_{sce}$), end of a scenario ($E_{sce}$), beginning of a human audience ($B_{hum}$), middle of a human audience ($M_{hum}$), end of a human audience ($E_{hum}$), and no label (O), and the labels are used to generate the tags.

2. The system of claim 1, wherein the NER model comprises a bidirectional encoder representations from transformers (BERT) layer, a bidirectional long short-term memory (BiLSTM) layer, and a conditional random field (CRF) layer.

3. The system of claim 1, wherein the confidence score of each of the pseudo tags is a number of detections of the pseudo tags from the product descriptions.

4. The system of claim 1, wherein the tags have different types, and the types of the tags include brand tags indicating brands of the products, industrial attribution tags indicating important physical features of the products, function tags indicating functions of the products, style tags indicating styles of the products, feeling tags indicating impression of customers to the products, scenario tags indicating suitable scenarios for using the products, and audience tags indicating targeted customers of the products, the threshold is 2-3 for the brand tags, 5-20 for the industrial attribution tags, the style tags, the audience tags, and the scenario tags, and 10-50 for the feeling tags.

5. The system of claim 4, wherein values of the thresholds of the tags increase during different rounds of repeating the steps of training, predicting, calculating, comparing and adding.

6. The system of claim 1, wherein the CRF layer is configured to learn constraint between labels by maximizing a sentence labeling score, and the sentence labeling score for each of the plurality of sentence predictions is calculated by:

$$s(X,y) = \Sigma_{i=0}^{n} A_{y_i,y_{i+1}} + \Sigma_{i=1}^{n} P_{i,y_i},$$

wherein X is one of the documents and comprises n number of words $x_1, x_2, \ldots, x_n$, Y is predicted label sequence of the one of the documents and comprises $y_1, y_2, \ldots, y_n$, $A_{y_i,y_{i+1}}$ is a matrix of transition score representing transition from the label $y_i$ to the label $y_{i+1}$ and corresponds to the constraint between neighboring labels, and $P_{i,y_i}$ is a possibility of the i-th word in the documents having the label $y_i$.

7. The system of claim 6, wherein the sentence labeling score for each of the plurality of sentence predictions is normalized by:

$$p(y \mid X) = \frac{e^{s(X,y)}}{\Sigma_{\tilde{y} \in Y_x} e^{s(X,\tilde{y})}},$$

wherein p(y|X) is a normalized possibility for the document X relative to the label y, ỹ is any one of the predicted labels of the documents.

8. The system of claim 1, wherein the computer executable code is further configured to: provide the updated tags as keywords of the corresponding products, such that a user can use the keywords to find the corresponding products via a search engine.

9. The system of claim 1, wherein the computer executable code is further configured to: provide the updated tags as keywords of the corresponding products, and displaying the keywords on a homepage of the corresponding products as comment tags or title words.

10. A method, comprising:
retrieving, by a computing device, product descriptions of products, and providing, by the computing device, a plurality of seed tags, wherein the product descriptions comprises text identical to the seed tags and the seed tags characterize at least one of the products;
training, by the computing device, a named-entity recognition (NER) model using the product descriptions and the seed tags;
predicting, by the computing device, pseudo tags from the product descriptions using the NER model;
calculating, by the computing device, confidence scores of the pseudo tags;
comparing, by the computing device, each of the confidence scores with a threshold, and defining one of the pseudo tags as a true tag when the confidence score of the pseudo tag is greater than the threshold;
adding, by the computing device, the true tags to the seed tags to obtain updated tags; and
repeating, by the computing device, the steps of training, predicting, calculating, comparing and adding using the product descriptions and the updated tags, so as to keep updating the updated tags,
wherein the NER model is configured to provide a label for each character of the product descriptions, the labels comprises beginning of a brand ($B_{bra}$), middle of a brand ($M_{bra}$), end of a brand ($E_{bra}$), beginning of a product industrial attributions ($B_{att}$), middle of a product industrial attribution ($M_{att}$), end of a product industrial attribution ($E_{att}$), beginning of a function ($B_{fun}$), middle of a function ($M_{fun}$), end of a function ($E_{fun}$), beginning of a style ($B_{sty}$), middle of a style ($M_{sty}$), end of a style ($E_{sty}$), beginning of a feeling ($B_{fel}$), middle of a feeling ($M_{fel}$), end of a feeling ($E_{fel}$), beginning of a scenario ($B_{sce}$), middle of a scenario ($M_{sce}$), end of a scenario ($E_{sce}$), beginning of a human audience ($B_{hum}$), middle of a human audience ($M_{hum}$), end of a human audience ($E_{hum}$), and no label (O), and the labels are used to generate the tags.

11. The method of claim 10, wherein the NER model comprises a bidirectional encoder representations from transformers (BERT) layer, a bidirectional long short-term memory (BiLSTM) layer, and a conditional random field (CRF) layer.

12. The method of claim 10, wherein the confidence score of each of the pseudo tags is a number of detections of the pseudo tags from the product descriptions.

13. The method of claim 10, wherein the tags have different types, and the types of tags comprises brand tags indicating brands of the products, industrial attribution tags indicating important physical features of the products, function tags indicating functions of the products, style tags indicating styles of the products, feeling tags indicating impression of customers to the products, scenario tags indicating suitable scenarios for using the products, and audience tags indicating targeted customers of the products, the threshold is 2-3 for the brand tags, 5-20 for the industrial attribution tags, the style tags, the audience tags, and the scenario tags, and 10-50 for the feeling tags.

14. The method of claim 10, wherein the CRF layer is configured to learn constraint between labels by maximizing a sentence labeling score, and the sentence labeling score for each of the plurality of sentence predictions is calculated by:

$$s(X,y) = \Sigma_{i=0}^{n} A_{y_i,y_{i+1}} + \Sigma_{i=1}^{n} P_{i,y_i},$$

wherein X is one of the documents and comprises n number of words $x_1, x_2, \ldots, x_n$, Y is predicted label sequence of the one of the documents and comprises $y_1, y_2, \ldots, y_n$, $A_{y_i,y_{i+1}}$ is a matrix of transition score representing transition from the label $y_i$ to the label $y_{i+1}$ and corresponds to the constraint between neighboring labels, and $P_{i,y_i}$ is a possibility of the i-th word in the documents having the label $y_i$.

15. The system of claim 14, wherein the sentence labeling score for each of the plurality of sentence predictions is normalized by:

$$p(y \mid X) = \frac{e^{s(X,y)}}{\Sigma_{\tilde{y} \in Y_x} e^{s(X,\tilde{y})}},$$

wherein p(y|X) is a normalized possibility for the document X relative to the label y, ỹ is any one of the predicted labels of the documents.

16. The method of claim 10, further comprising:
providing the updated tags as keywords of the corresponding products, such that a user can use the keywords to find the corresponding products via a search bar; or
providing the updated tags as keywords of the corresponding products, and displaying the keywords on a homepage of the corresponding products as comment tags or title words.

17. A non-transitory computer readable medium storing computer executable code, wherein the computer executable code, when executed at a processor of a computing device, is configured to:
retrieve product descriptions of products and a plurality of seed tags, wherein the product descriptions comprises text identical to the seed tags and the seed tags characterize at least one of the products;
train a named-entity recognition (NER) model using the product descriptions and the seed tags;
predict pseudo tags from the product descriptions using the NER model;
calculate confidence scores of the pseudo tags;
compare each of the confidence scores with a threshold, and define one of the pseudo tags as a true tag when the confidence score of the pseudo tag is greater than the threshold;
add the true tags to the seed tags to obtain updated tags; and
repeat the steps of training, predicting, calculating, comparing and adding using the product descriptions and the updated tags, so as to keep updating the updated tags,
wherein the NER model is configured to provide a label for each character of the product descriptions, the labels comprises beginning of a brand ($B_{bra}$), middle of a brand ($M_{bra}$), end of a brand ($E_{bra}$), beginning of a product industrial attributions ($B_{att}$), middle of a product industrial attribution ($M_{att}$), end of a product industrial attribution ($E_{att}$), beginning of a function ($B_{fun}$), middle of a function ($M_{fun}$), end of a function ($E_{fun}$), beginning of a style ($B_{sty}$, middle of a style ($M_{sty}$), end of a style ($E_{sty}$), beginning of a feeling ($B_{fel}$), middle of a feeling ($M_{fel}$), end of a feeling ($E_{fel}$), beginning of a scenario ($B_{sce}$), middle of a scenario ($M_{sce}$), end of a scenario ($E_{sce}$), beginning of a human audience ($B_{hum}$), middle of a human audience ($M_{hum}$), end of a human audience ($E_{hum}$), and no label (O), and the labels are used to generate the tags.

18. The non-transitory computer readable medium of claim 17, wherein the NER model comprises a bidirectional encoder representations from transformers (BERT) layer, a bidirectional long short-term memory (BiLSTM) layer, and a conditional random field (CRF) layer.

\* \* \* \* \*